(12) United States Patent
Lei et al.

(10) Patent No.: US 11,956,733 B2
(45) Date of Patent: Apr. 9, 2024

(54) POWER CONTROL DESIGN FOR NON-ORTHOGONAL MULTIPLE ACCESS

(71) Applicant: QUALCOMM Incorporated, San Diego, CA (US)

(72) Inventors: Jing Lei, San Diego, CA (US); Tingfang Ji, San Diego, CA (US); Peter Gaal, San Diego, CA (US); Xiao Feng Wang, San Diego, CA (US); Joseph Binamira Soriaga, San Diego, CA (US); Seyong Park, San Diego, CA (US); Gabi Sarkis, San Diego, CA (US); Wanshi Chen, San Diego, CA (US); Naga Bhushan, San Diego, CA (US); Ying Wang, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/581,425

(22) Filed: Jan. 21, 2022

(65) Prior Publication Data
US 2022/0150845 A1 May 12, 2022

Related U.S. Application Data

(62) Division of application No. 16/515,941, filed on Jul. 18, 2019, now Pat. No. 11,259,252.

(Continued)

(51) Int. Cl.
*H04W 52/24* (2009.01)
*H04L 5/00* (2006.01)
(Continued)

(52) U.S. Cl.
CPC ......... *H04W 52/242* (2013.01); *H04L 5/0048* (2013.01); *H04W 24/08* (2013.01);
(Continued)

(58) Field of Classification Search
CPC .... H04W 72/23; H04W 72/044; H04W 52/34
See application file for complete search history.

(56) References Cited

U.S. PATENT DOCUMENTS

2005/0249164 A1 11/2005 Kwak et al.
2010/0015967 A1* 1/2010 Perets .................. H04W 52/08
455/571

(Continued)

*Primary Examiner* — Yee F Lam
(74) *Attorney, Agent, or Firm* — Harrity & Harrity, LLP

(57) ABSTRACT

Various aspects of the present disclosure generally relate to wireless communication. In some aspects, a user equipment may determine at least one of a downlink path loss value or an uplink path loss value associated with a base station; receive system information, a semi-persistently configured grant via RRC or a dynamic uplink grant via DCI from the base station, wherein the RRC signaling or the dynamic uplink grant identifies a power control value associated with one user or a plurality of users associated with the base station; and determine a transmit power for a data or control transmission based at least in part on at least one of the downlink path loss value or the uplink path loss value and the power control value. Numerous other aspects are provided.

30 Claims, 9 Drawing Sheets

Related U.S. Application Data

(60) Provisional application No. 62/701,404, filed on Jul. 20, 2018.

(51) Int. Cl.
  *H04W 24/08* (2009.01)
  *H04W 52/10* (2009.01)
  *H04W 52/36* (2009.01)
  *H04W 72/21* (2023.01)
  *H04W 72/23* (2023.01)
  *H04W 74/08* (2009.01)
  *H04W 74/0833* (2024.01)

(52) U.S. Cl.
  CPC ......... *H04W 52/10* (2013.01); *H04W 52/365* (2013.01); *H04W 72/21* (2023.01); *H04W 72/23* (2023.01); *H04W 74/0833* (2013.01)

(56) References Cited

U.S. PATENT DOCUMENTS

| | | |
|---|---|---|
| 2011/0281525 A1 | 11/2011 | Furuskar et al. |
| 2012/0327804 A1 | 12/2012 | Park et al. |
| 2014/0220996 A1* | 8/2014 | Kim .................... H04W 52/365 455/561 |
| 2014/0274196 A1 | 9/2014 | Dai et al. |
| 2015/0036605 A1* | 2/2015 | Kim ...................... H04W 24/08 370/329 |
| 2016/0119881 A1 | 4/2016 | Merlin et al. |
| 2017/0188391 A1 | 6/2017 | Rajagopal et al. |
| 2017/0251517 A1 | 8/2017 | Kimura et al. |
| 2017/0264409 A1 | 9/2017 | Guo et al. |
| 2017/0367116 A1 | 12/2017 | Li et al. |
| 2018/0070335 A1* | 3/2018 | Amuru .................. H04L 5/0091 |
| 2018/0139759 A1 | 5/2018 | Park et al. |
| 2018/0288746 A1* | 10/2018 | Zhang .................... H04L 1/0031 |
| 2018/0310257 A1 | 10/2018 | Papasakellariou |
| 2018/0324708 A1 | 11/2018 | Cheng |
| 2018/0324715 A1 | 11/2018 | Ryoo et al. |
| 2019/0045489 A1* | 2/2019 | He ........................ H04W 72/23 |
| 2019/0116560 A1 | 4/2019 | Naderializadeh et al. |
| 2019/0268852 A1 | 8/2019 | Ryu et al. |
| 2019/0289628 A1* | 9/2019 | Xiong ................. H04W 52/365 |
| 2019/0312694 A1* | 10/2019 | Jia ......................... H04L 1/003 |
| 2020/0022090 A1* | 1/2020 | Li ........................ H04W 52/242 |
| 2020/0029283 A1 | 1/2020 | Lei et al. |
| 2020/0037269 A1 | 1/2020 | Ryu et al. |
| 2020/0404708 A1* | 12/2020 | Zhang ............... H04W 74/0808 |
| 2021/0007060 A1 | 1/2021 | Chen |
| 2021/0274434 A1* | 9/2021 | Jactat ................... H04W 48/18 |

* cited by examiner

| UE Group Number j | Target of Received Power | PRB Size | PL Compensation Factor | Range of TBS | Random Seed for Scrambling Code Generation | Spreading Factor | Number of Branches | Modulation per Branch | Code Rate | Range of Power Headroom |
|---|---|---|---|---|---|---|---|---|---|---|
| 1 | $P_o(1)$ | $M(1)$ | $\alpha(1)$ | [A1, B1] | s1 | SF1 | N1 | Q1 | R1 | [U1, V1] |
| 2 | $P_o(2)$ | $M(2)$ | $\alpha(2)$ | [A2, B2] | s2 | SF2 | N2 | Q2 | R2 | [U2, V2] |
| 3 | $P_o(3)$ | $M(3)$ | $\alpha(3)$ | [A3, B3] | s3 | SF3 | N3 | Q3 | R3 | [U3, V3] |

POWER CONTROL DESIGN FOR NON-ORTHOGONAL MULTIPLE ACCESS

CROSS-REFERENCE TO RELATED APPLICATIONS

This application is a divisional of U.S. patent application Ser. No. 16/515,941, filed Jul. 18, 2019, entitled "POWER CONTROL DESIGN FOR NON-ORTHOGONAL MULTIPLE ACCESS," which claims priority to Provisional Patent Application No. 62/701,404, filed on Jul. 20, 2018, entitled "POWER CONTROL DESIGN FOR NON-ORTHOGONAL MULTIPLE ACCESS," which are hereby expressly incorporated by reference herein.

FIELD OF THE DISCLOSURE

Aspects of the present disclosure generally relate to wireless communication, and more particularly to techniques and apparatuses for power control design for non-orthogonal multiple access (NOMA).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining at least one of a downlink path loss value or an uplink path loss value associated with a base station and the UE; receiving an uplink grant from the base station, wherein the uplink grant identifies a power control value associated with the base station; and determining a transmit power for a data or control transmission based at least in part on at least one of the downlink path loss value or the uplink path loss value and the power control value.

In some aspects, a UE for wireless communication may include memory and one or more processors operatively coupled to the memory. The memory and the one or more processors may be configured to determine at least one of a downlink path loss value or an uplink path loss value associated with a base station and the UE; receive an uplink grant from the base station, wherein the uplink grant identifies a power control value associated with the base station; and determine a transmit power for a data or control transmission based at least in part on at least one of the downlink path loss value or the uplink path loss value and the power control value.

In some aspects, a non-transitory computer-readable medium may store one or more instructions for wireless communication. The one or more instructions, when executed by one or more processors of a UE, may cause the one or more processors to determine at least one of a downlink path loss value or an uplink path loss value associated with a base station and the UE; receive an uplink grant from the base station, wherein the uplink grant identifies a power control value associated with the base station; and determine a transmit power for a data or control transmission based at least in part on at least one of the downlink path loss value or the uplink path loss value and the power control value.

In some aspects, an apparatus for wireless communication may include means for determining at least one of a downlink path loss value or an uplink path loss value associated with a base station and the UE; means for receiving an uplink grant from the base station, wherein the uplink grant identifies a power control value associated with the base station; and means for determining a transmit power for a data or control transmission based at least in part on at least one of the downlink path loss value or the uplink path loss value and the power control value.

In some aspects, a method of wireless communication, performed by a user equipment (UE), may include receiving configuration information identifying one or more target receive powers for a data or control transmission and corresponding configurations for uplink power control associated with the one or more target receive powers; measuring a downlink path loss value of the UE; selectively determining a combined path loss value, wherein the combined path loss value is determined when the downlink path loss value and an uplink path loss value are available based at least in part on the uplink path loss value being reported to the UE by a base station; and determining at least one of a transmit power or a configuration, of the corresponding configurations for uplink power control, for the uplink data or control transmission based at least in part on at least one of the downlink path loss value, the uplink path loss value, or the combined path loss value, and based at least in part on the configuration information.

In some aspects, a UE for wireless communication may include memory and one or more processors operatively coupled to the memory. The memory and the one or more processors may be configured to receive configuration information identifying one or more target receive powers for a data or control transmission and corresponding configurations for uplink power control associated with the one or more target receive powers; measure a downlink path loss value of the UE; selectively determine a combined path loss value, wherein the combined path loss value is determined when the downlink path loss value and an uplink path loss value are available based at least in part on the uplink path loss value being reported to the UE by a base station; and determine at least one of a transmit power or a configuration, of the corresponding configurations for uplink power control, for the uplink data or control transmission based at least in part on at least one of the downlink path loss value, the uplink path loss value, or the combined path loss value, and based at least in part on the configuration information.

In some aspects, a non-transitory computer-readable medium may store one or more instructions for wireless communication. The one or more instructions, when executed by one or more processors of a UE, may cause the one or more processors to receive configuration information identifying one or more target receive powers for a data or control transmission and corresponding configurations for uplink power control associated with the one or more target receive powers; measure a downlink path loss value of the UE; selectively determine a combined path loss value, wherein the combined path loss value is determined when the downlink path loss value and an uplink path loss value are available based at least in part on the uplink path loss value being reported to the UE by a base station; and determine at least one of a transmit power or a configuration, of the corresponding configurations for uplink power control, for the uplink data or control transmission based at least in part on at least one of the downlink path loss value, the uplink path loss value, or the combined path loss value, and based at least in part on the configuration information.

In some aspects, an apparatus for wireless communication may include means for receiving configuration information identifying one or more target receive powers for a data or control transmission and corresponding configurations for uplink power control associated with the one or more target receive powers; means for measuring a downlink path loss value of the apparatus; means for selectively determining a combined path loss value, wherein the combined path loss value is determined when the downlink path loss value and an uplink path loss value are available based at least in part on the uplink path loss value being reported to the apparatus by a base station; and means for determining at least one of a transmit power or a configuration, of the corresponding configurations for uplink power control, for the uplink data or control transmission based at least in part on at least one of the downlink path loss value, the uplink path loss value, or the combined path loss value, and based at least in part on the configuration information.

In some aspects, a method of wireless communication, performed by a UE, may include determining a transmit power for a data or control transmission, wherein the data or control transmission is a grant-free transmission; performing the data or control transmission using non-orthogonal multiple access (NOMA) in accordance with the transmit power; determining that the data or control transmission has failed; and performing a retransmission of the data or control transmission using a grant-based approach.

In some aspects, a UE for wireless communication may include memory and one or more processors operatively coupled to the memory. The memory and the one or more processors may be configured to determine a transmit power for a data or control transmission, wherein the data or control transmission is a grant-free transmission; perform the data or control transmission using NOMA in accordance with the transmit power; determine that the data or control transmission has failed; and perform a retransmission of the data or control transmission using a grant-based approach.

In some aspects, a non-transitory computer-readable medium may store one or more instructions for wireless communication. The one or more instructions, when executed by one or more processors of a UE, may cause the one or more processors to determine a transmit power for a data or control transmission, wherein the data or control transmission is a grant-free transmission; perform the data or control transmission using NOMA in accordance with the transmit power; determining that the data or control transmission has failed; and perform a retransmission of the data or control transmission using a grant-based approach.

In some aspects, an apparatus for wireless communication may include means for determining a transmit power for a data or control transmission, wherein the data or control transmission is a grant-free transmission; means for performing the data or control transmission using non-orthogonal multiple access (NOMA) in accordance with the transmit power; means for determining that the data or control transmission has failed; and means for performing a retransmission of the data or control transmission using a grant-based approach.

In some aspects, a method of wireless communication, performed by a base station, may include transmitting, to a UE, configuration information using at least one of system information, radio resource control signaling, or a dynamic uplink grant, wherein the configuration information identifies one or more target receive powers for a data or control transmission and corresponding configurations for uplink power control associated with the one or more target receive powers; transmitting information indicating an uplink path loss value; and receiving the data or control transmission, wherein a transmit power of the data or control transmission is based at least in part on at least one of a downlink path loss value associated with the UE, the uplink path loss value, or a combined path loss value, and wherein the transmit power is based at least in part on the configuration information.

In some aspects, a base station for wireless communication may include memory and one or more processors operatively coupled to the memory. The memory and the one or more processors may be configured to transmit, to a UE, configuration information using at least one of system information, radio resource control signaling, or a dynamic uplink grant, wherein the configuration information identifies one or more target receive powers for a data or control transmission and corresponding configurations for uplink power control associated with the one or more target receive powers; transmit information indicating an uplink path loss value; and receive the data or control transmission, wherein a transmit power of the data or control transmission is based at least in part on at least one of a downlink path loss value associated with the UE, the uplink path loss value, or a combined path loss value, and wherein the transmit power is based at least in part on the configuration information.

In some aspects, a non-transitory computer-readable medium may store one or more instructions for wireless communication. The one or more instructions, when executed by one or more processors of a UE, may cause the one or more processors to transmit, to a UE, configuration information using at least one of system information, radio resource control signaling, or a dynamic uplink grant, wherein the configuration information identifies one or more target receive powers for a data or control transmission and corresponding configurations for uplink power control associated with the one or more target receive powers; transmit information indicating an uplink path loss value; and receive the data or control transmission, wherein a transmit power of the data or control transmission is based at least in part on at least one of a downlink path loss value associated with the UE, the uplink path loss value, or a combined path loss value, and wherein the transmit power is based at least in part on the configuration information.

In some aspects, an apparatus for wireless communication may include means for transmitting, to a UE, configuration information using at least one of system information, radio resource control signaling, or a dynamic uplink grant, wherein the configuration information identifies one or more target receive powers for a data or control transmission and corresponding configurations for uplink power control associated with the one or more target receive powers; means for transmitting information indicating an uplink path loss value; and means for receiving the data or control transmission, wherein a transmit power of the data or control transmission is based at least in part on at least one of a downlink path loss value associated with the UE, the uplink path loss value, or a combined path loss value, and wherein the transmit power is based at least in part on the configuration information.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements").

These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
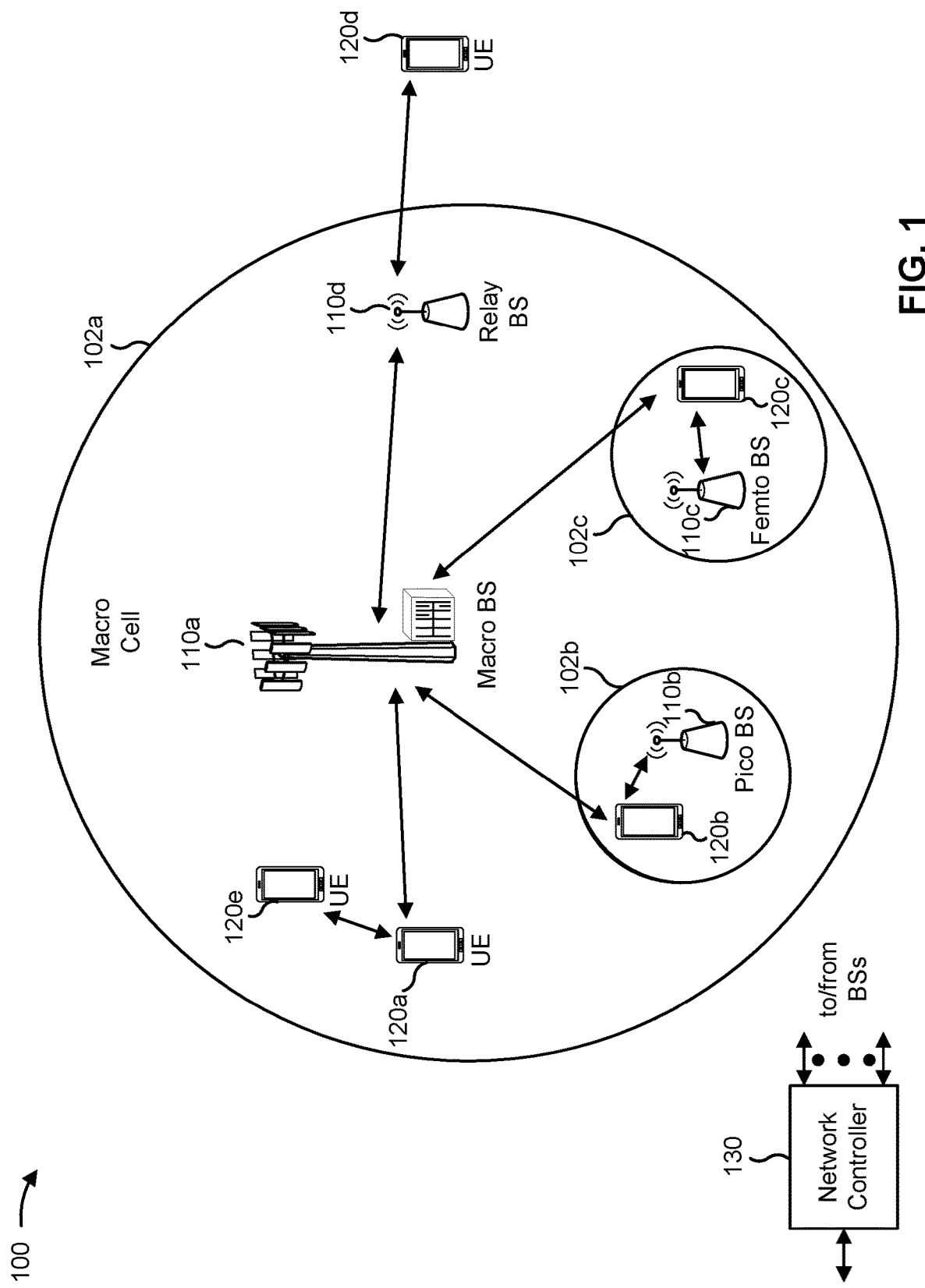
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
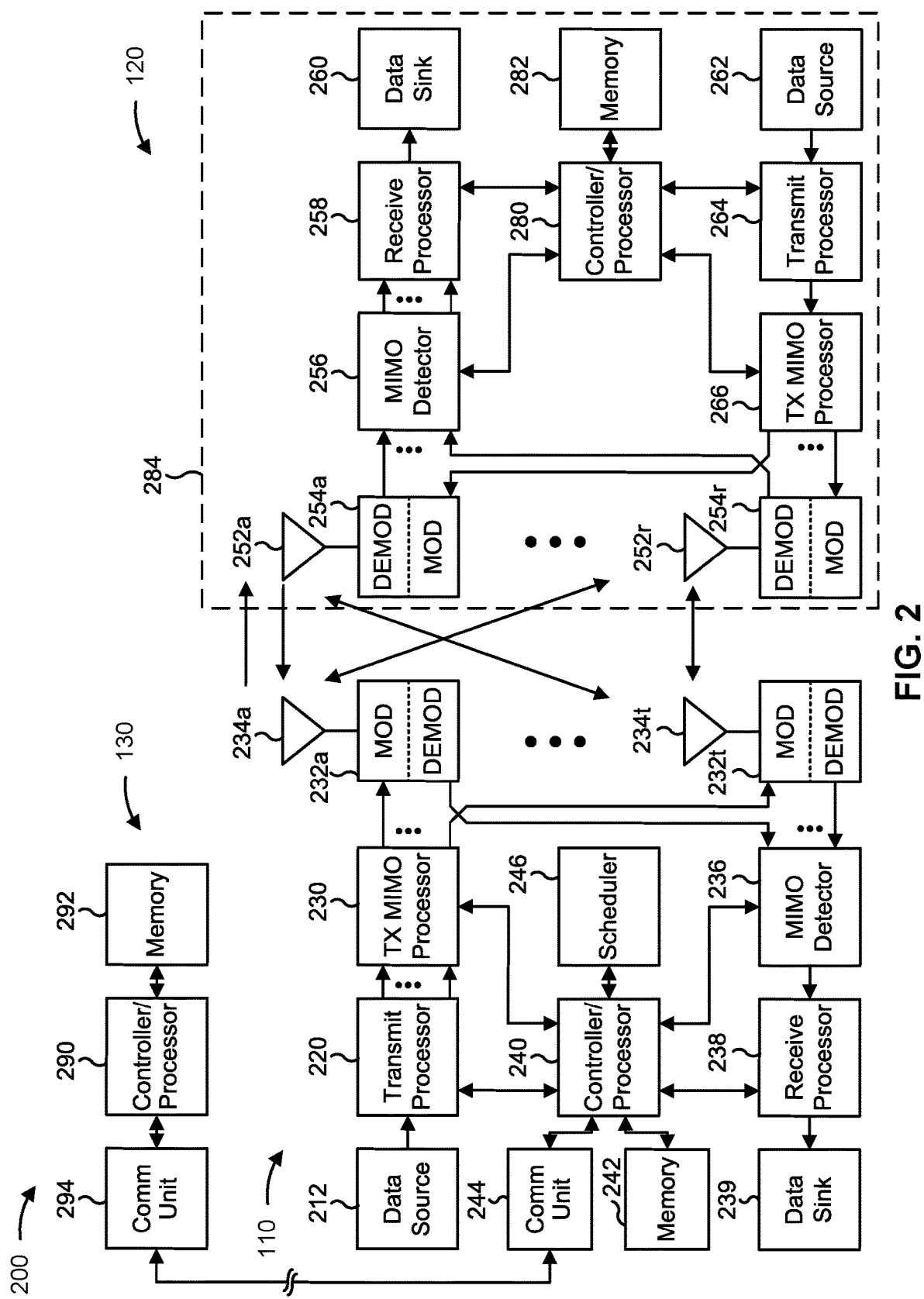
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power control design for NOMA, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining at least one of a downlink path loss value or an uplink path loss value associated with a base station; means for receiving an uplink grant from the base station, wherein the uplink grant identifies a power control value associated with the base station; means for determining a transmit power for a data or control transmission based at least in part on at least one of the downlink path loss value or the uplink path loss value and the power control value; means for providing at least one of a buffer status report or a power headroom value with the scheduling request; means for receiving the uplink path loss value in a medium access control control element; means for determining a combined path loss value based at least in part on the downlink path loss value and the uplink path loss value, wherein the transmit power is based at least in part on the combined path loss value; means for determining the group of the UE; means for receiving information identifying a radio network temporary identifier of the group of the UE; means for transmitting the data or control transmission using the transmit power; means for receiving configuration information identifying one or more target receive powers for a data or control transmission and corresponding configurations for uplink power control associated with the one or more target receive powers; means for determining a downlink path loss value of the UE; means for selectively determining a combined path loss value, wherein the combined path loss value is determined when the downlink path loss value and an uplink path loss value are available; means for determining at least one of a transmit power or a configuration, of the corresponding configurations for uplink power control, for the uplink data or control transmission based at least in part on at least one of the downlink path loss value, the uplink path loss value, or the combined path loss value, and based at least in part on the configuration information; means for receiving information identifying the uplink path loss value; means for determining the uplink path loss value; means for determining a group of the UEs within a cell, of one or more groups of UEs within the cell, wherein one or more target receive powers and the corresponding configurations for uplink power control are to be determined by a network and are to be assigned to the one or more groups of UEs; means for determining a transport format for the data transmission according to the configuration; means for determining at least one of a transmit power or a configuration for a repetition of the initial data or control transmission based at least in part on at least one of the downlink path loss value or the uplink path loss value and the configuration information; means for determining a selected target receive power of the one or more target receive powers, wherein determining at least one of the transmit power or the configuration is based at least in part on the selected target receive power; means for determining a transmit power for a data or control transmission, wherein the data or control transmission is a grant-free transmission; means for performing the data or control transmission using non-orthogonal multiple access (NOMA) in accordance with the transmit power; means for determining that the data or control transmission has failed; means for performing a retransmission of the data or control transmission using a grant-based approach; and/or the like. In some aspects, such means may include one or more components of UE 120 described in connection with FIG. 2.

In some aspects, BS 110 may include means for transmitting, to a UE, configuration information using at least one of system information, radio resource control signaling, or a dynamic uplink grant, wherein the configuration information identifies one or more target receive powers for a data or control transmission and corresponding configurations for uplink power control associated with the one or more target receive powers; means for transmitting information indicating an uplink path loss value; and means for receiving the data or control transmission, wherein a transmit power of the data or control transmission is based at least in part on at least one of a downlink path loss value associated with the UE, the uplink path loss value, or a combined path loss value, and wherein the transmit power is based at least in part on the configuration information; and/or the like. In some aspects, such means may include one or more components of BS 110 described in connection with FIG. 2.

As indicated above, FIG. 2 is provided merely as an example. Other examples may differ from what is described with regard to FIG. 2.

A non-orthogonal multiple access (NOMA) transmission scheme may allow multiple UEs to share time and frequency resources in a non-orthogonal fashion when transmitting respective uplink communications. In some cases, the NOMA transmission scheme may be designed with a goal to cause the multiple UEs to use different multiple access signatures in association with transmitting these respective overlapping transmissions (e.g., in order to allow a gNB to properly decode the overlapping transmissions). For example, NOMA may be used in some NR applications, such as a two-step random access channel (RACH) procedure in which a RACH preamble and a physical uplink shared channel (PUSCH) are combined in a single message (e.g., MsgA) and a preamble response and a physical downlink shared channel (PDSCH) are combined in another message (e.g., MsgB). NOMA may be used for grant-free transmissions and grant-based transmissions.

A UE and a base station may use uplink power control techniques to determine an appropriate transmit power for the UE. Uplink power control may be important for successful operation of the UE, particularly in NOMA. For example, reliable power control may improve reliability of reception of uplink physical channels and/or signals. Furthermore, some NOMA multiplexing and/or quality of service (QoS) schemes may be based at least in part on varying power levels (e.g., the multiple access signature of a transmission may be based at least in part on one or more power levels of the transmission). Still further, inter-cell interference management may be important for successful deployment of NOMA, and inter-cell interference may be reduced by reliable uplink power control techniques.

Some techniques and apparatuses described herein provide power control design for grant-based transmissions and/or grant-free transmissions. For example, some techniques and apparatuses described herein may be applicable for NOMA transmissions. Some techniques and apparatuses described herein may provide power control using a closed-loop approach, wherein both downlink and uplink path loss values may be used to determine a transmit power for a UE. Additionally, or alternatively, some techniques and apparatuses described herein may provide power control using an open-loop approach and/or in connection with UE groups. For example, a UE may identify a UE group and may determine a transmit power based at least in part on information associated with the UE group and based at least in part on a downlink path loss value and optionally an uplink path loss value. Furthermore, some techniques and apparatuses described herein provide for a grant-free first transmission (e.g., a contention-based first transmission) and a fallback to a grant-based second transmission or retransmission (e.g., a contention-free second transmission) when the first transmission is unsuccessful In this way, reliability of uplink power control for UEs may be improved, which may reduce inter-cell interference, improve diversity in QoS, and provide higher multiplexing capacity and/or spectral efficiency.

Some techniques and apparatuses described herein are described in the context of NOMA. However, some techniques and apparatuses described herein may be applied for orthogonal multiple access (OMA) as well as NOMA. Furthermore, "path loss value" is used interchangeably with "path loss estimation." Furthermore, "UE group" is used interchangeably with "group of UEs."

Figure 3:
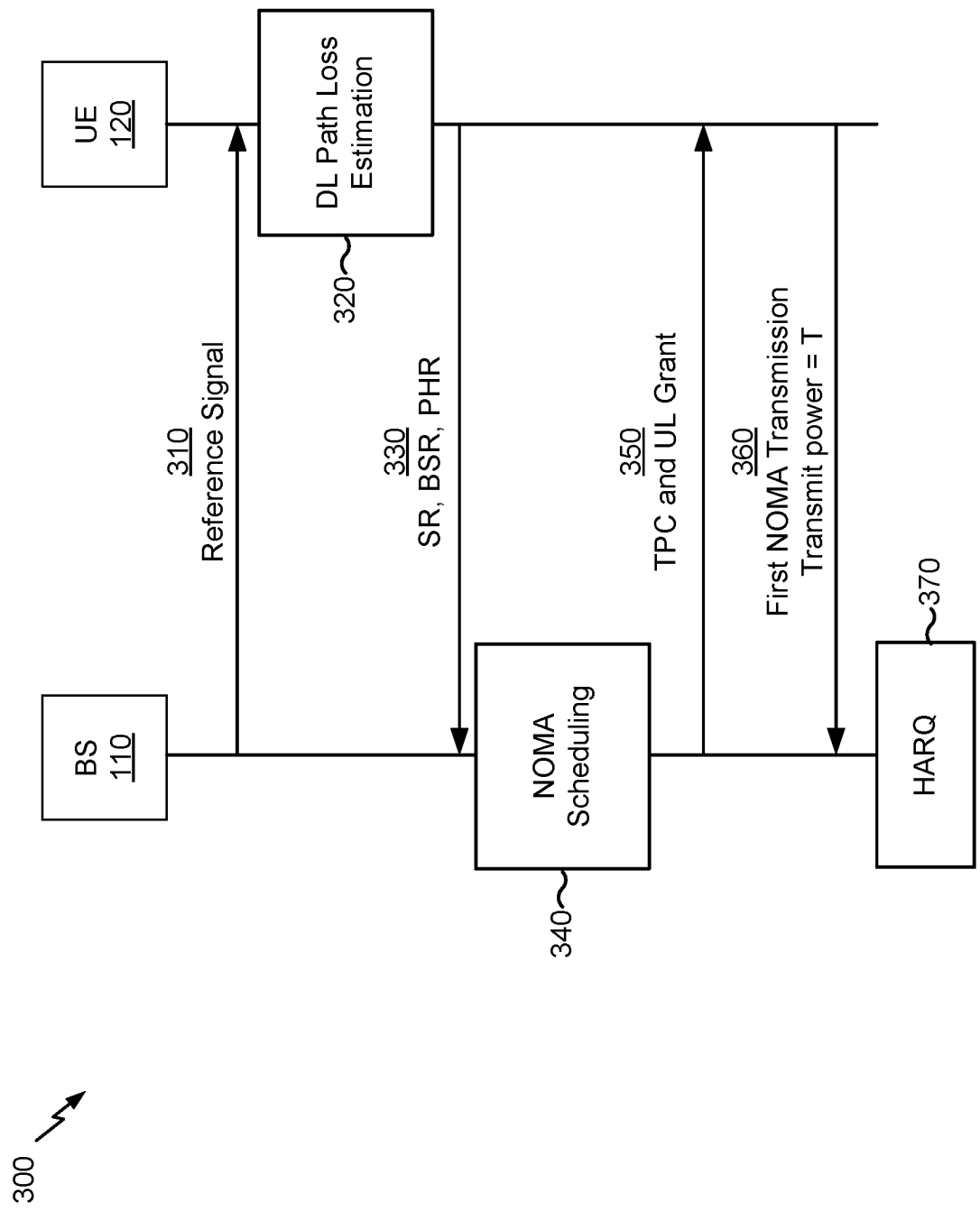
FIG. 3 is a diagram illustrating an example of power control for grant-based NOMA, in accordance with various aspects of the present disclosure.

FIG. 3 is a diagram illustrating an example 300 of power control for grant-based NOMA, in accordance with various aspects of the present disclosure.

As shown in FIG. 3, and by reference number 310, a UE 120 may receive a reference signal from a BS 110. In some aspects, the reference signal may include a downlink reference signal. For example, the reference signal may include a synchronization signal (e.g., a primary synchronization signal, a secondary synchronization signal, etc.), a demodulation reference signal (DMRS), a physical broadcast channel, a channel state information reference signal, a synchronization signal block, system information (e.g., a system information block (SIB)), and/or the like. In some aspects, the reference signal may include a DMRS for broadcasting or multicasting common system information. For example, the reference signal may include a DMRS for a group common control channel (e.g., a group common physical downlink control channel), a DMRS for a remaining minimum system information (RMSI) carried by a physical downlink shared channel, and/or the like. In some aspects, the reference signal may be quasi-collocated (QCLed) with a data or control transmission (e.g., a NOMA transmission, an OMA transmission, etc.) to be transmitted by the UE 120 (e.g., the transmission shown by reference number 350), which may enable path loss estimation for the data or control transmission on the downlink and/or the uplink.

As shown by reference number 320, the UE 120 may perform downlink path loss estimation based at least in part on the reference signal. For example, the UE 120 may determine a downlink path loss value based at least in part on the reference signal. In some aspects, the UE 120 may determine the downlink path loss value based at least in part on a physical channel (e.g., a physical downlink shared channel (PDSCH) or physical downlink control channel (PDCCH)). In some aspects, the UE 120 may determine the downlink path loss value based at least in part on the reference signal being QCLed with one or more transmissions of the UE.

As shown by reference number 330, the UE 120 may provide a scheduling request (SR) to the BS 110. For example, the scheduling request may be a request for the BS 110 to schedule uplink resources (e.g., NOMA resources, OMA resource, etc.) for a data or control transmission of the UE 120. In some aspects, the UE 120 may provide information with the scheduling request, such as a buffer status report (BSR), a power headroom report (PHR), and/or the like. The BS 110 may use the BSR, PHR, and/or the like to perform scheduling of the UE 120. In some aspects, the UE 120 may provide the scheduling request before starting a NOMA communication. In some aspects, the scheduling request may be QCLed with the data or control transmission of the UE 120, which may enable uplink path loss estimation by the BS 110 using the scheduling request, as described in more detail below. In some aspects, the UE 120 may provide the scheduling request using a sounding reference signal, a physical uplink control channel, and/or the like. In some aspects, the UE 120 may provide the scheduling request as a reference signal or in association with a reference signal, such as a sounding reference signal, a DMRS (e.g., a DMRS of a physical uplink control channel (PUCCH), etc.), and/or the like.

As shown by reference number 340, the BS 110 may perform scheduling based at least in part on the scheduling request. For example, the BS 110 may determine a resource (e.g., a NOMA resource, an OMA resource, etc.) for the UE based at least in part on the scheduling request, the BSR, the PHR, and/or the like. In some aspects, the BS 110 may determine information associated with scheduling the resource for the UE 120, such as a bandwidth part selection, a spreading factor, an overloading ratio, a number of branches, a modulation scheme, a code rate, a permutation pattern, an interleaving pattern, a time hopping pattern, a frequency hopping pattern, and/or the like.

In some aspects, the BS 110 may determine an uplink path loss value based at least in part on the scheduling request. For example, the BS 110 may perform uplink path loss estimation using the scheduling request (or information associated with the scheduling request, or a signal associated with the scheduling request). In some aspects, the BS 110 may determine the uplink path loss value based at least in part on the scheduling request being QCLed with the data or control transmission of the UE 120. In some aspects, the BS 110 may determine the uplink path loss value based at least in part on a received signal strength indicator (RSSI), a reference signal measurement, and/or the like.

In some aspects, the BS 110 may determine a transmit power control (TPC) value based at least in part on the scheduling request, the BSR, the PHR, and/or the uplink path loss value. For example, the BS 110 may determine that the UE 120 is to increase, decrease, or maintain a transmit power of the UE 120. The BS 110 may generate a TPC message based at least in part on the TPC value. For example, the TPC message may include one bit, two bits, or more than two bits that specify the TPC value for the UE 120. In some aspects, the TPC message may be specific to NOMA. For example, the TPC message may use more than two bits provided in downlink control information (DCI). In some aspects, the TPC message may use a format associated with Release 15 of a 3GPP standard for New Radio. For example, NR PDCCH DCI format 2_2 or 2_3 can be re-used for NOMA group power control. In some aspects, a new definition for the step size of power control or the mapping table of power ramping can be introduced for DCI format 2_2 or 2_3. In some aspects, the TPC message may use a particular range and/or granularity associated with closed-loop uplink power control (e.g., closed-loop uplink power control associated with NOMA, etc.).

As shown by reference number 350, the BS 110 may provide an uplink grant to the UE 120. As further shown, the uplink grant may be associated with a transmit power control (TPC) value, sometimes referred to herein as a power control value. For example, the uplink grant may include or be associated with the TPC message. In some aspects, the uplink grant may be provided using semi-persistent scheduling. For example, the uplink grant may be semi-persistently scheduled, which may be configured using radio resource control (RRC) signaling. In some aspects, the uplink grant may be received dynamically. In some aspects, the uplink grant and/or the TPC message may be associated with a particular DCI format, such as a DCI format associated with NOMA TPC. In some aspects, the TPC value may be provided using two or more bits of control information in a DCI payload.

In some aspects, the uplink grant and/or the TPC message may be associated with a particular radio network temporary identifier (RNTI). For example, the uplink grant and/or the TPC message may be associated with a RNTI specific to NOMA TPC. In some aspects, the uplink grant and/or the TPC message may be carried by UE-specific messaging, such as a UE-specific control channel. In some aspects, the uplink grant and/or the TPC message may be carried by a control channel, such as a group common PDCCH.

In some aspects, the BS 110 may provide information identifying the uplink path loss value to the UE 120. In some aspects, the BS 110 may provide the information identifying the uplink path loss value in a medium access control control element, downlink control information, radio resource control information, a data channel, and/or the like. In such a case, the UE 120 may determine a transmit power for the data or control transmission based at least in part on the uplink path loss value and the downlink path loss value.

In some aspects, the BS 110 may determine a combined path loss value based at least in part on the uplink path loss value and the downlink path loss value. For example, the UE 120 may provide information identifying the downlink path loss value, and the BS 110 may determine a combined path loss value using the uplink path loss value and the downlink path loss value. In such a case, the combined path loss value may be an average path loss value, a weighted combination, and/or the like. In some aspects, the weighted combination may have different weights for the uplink path loss value and for the downlink path loss value. In some aspects, the weighted combination may have different weights for different UE groups of a cell. In some aspects, the UE 120 may determine the combined path loss value.

As shown by reference number 360, the UE 120 may perform a first transmission (e.g., a data or control transmission) based at least in part on the uplink grant. As further shown, the first transmission may have a transmit power T. For example, the UE 120 may determine the transmit power based at least in part on the downlink path loss value, the uplink path loss value, and/or the combined path loss value. Additionally, or alternatively, the UE 120 may determine the transmit power based at least in part on the TPC value (e.g., by increasing, decreasing, or maintaining a transmit power of the UE 120 in accordance with the TPC value). In some aspects, the TPC value may specify the transmit power. In some aspects, the UE 120 may determine a configuration associated with transmitting the data or control transmission, such as a transport format and/or the like.

In some aspects, the UE 120 may determine a transmit power based at least in part on configuration information. In some aspects, the configuration information may be provided to the UE 120 by the BS 110, as described in more detail in connection with reference number 410 of FIG. 4, below. In some aspects, the configuration information may identify one or more UE groups of a cell. The configuration information may further identify respective configurations for power control for UEs of each UE group. The UE 120 may identify a UE group to which the UE 120 belongs (e.g., based at least in part on a BSR, a PHR, signaling from the BS 110, etc.). The UE 120 may determine the configuration for power control, and/or the transmit power, based at least in part on the configuration information. In some aspects, the configuration information may identify a reference signal resource configuration, such as a reference signal resource index for measuring the path loss, grouping the UEs, and determining a transmit power, a NOMA-specific resource configuration, and/or the like. For a more detailed description of the configuration information, refer to the description of FIG. 5, below.

In some aspects, the BS 110 may provide a TPC value for a UE group. For example, the BS 110 may provide a group common TPC message, which may provide more efficient handling of interference and path loss measurement than a UE-specific TPC message. In some aspects, the TPC value may be provided using a PDCCH, such as PDCCH DCI format 2_2, format 2_3, and/or the like. In some aspects, the TPC value may use a RNTI specific to NOMA UEs of a UE group. In some aspects, a DCI of the TPC value (e.g., a cyclic redundancy check of the DCI) may be scrambled using the RNTI. In some aspects, the NR group-common PDCCH may be used. In such a case, the BS 110 may allocate more than two bits for the group-common TPC. In some aspects, the BS 110 may allocate one or two bits for the group-common TPC.

In some aspects, the UE 120 may perform multiple transmissions. For example, the UE 120 may perform the first transmission and one or more repetitions of the first transmission (e.g., HARQ retransmissions, blind retransmissions, etc.) (not shown in FIG. 3). In some aspects, the UE 120 may determine respective transmit powers for multiple transmissions. For example, the multiple transmissions may be associated with different transmit powers, different configurations for power control, and/or the like. In some aspects, a UE group of the UE 120 may change between transmissions (e.g., the UE 120 may determine a different UE group for a first transmission than for a second transmission).

As shown by reference number 370, the BS 110 may perform a hybrid automatic repeat request (HARQ) operation based at least in part on the first transmission and/or the at least one repetition of the first transmission. In some aspects, the BS 110 may receive the first transmission and/or the at least one repetition of the first transmission. In some aspects, the UE 120 may provide a single transmission. In such a case, the BS 110 may receive and/or decode the single transmission. In other words, the techniques and apparatuses described herein are not limited to those involving repetitious communications. In this way, the UE 120 and the BS 110 may perform uplink power control based at least in part on a closed loop and based at least in part on downlink path loss values and uplink path loss values.

As indicated above, FIG. 3 is provided as an example. Other examples may differ from what is described with respect to FIG. 3.

Figure 4:
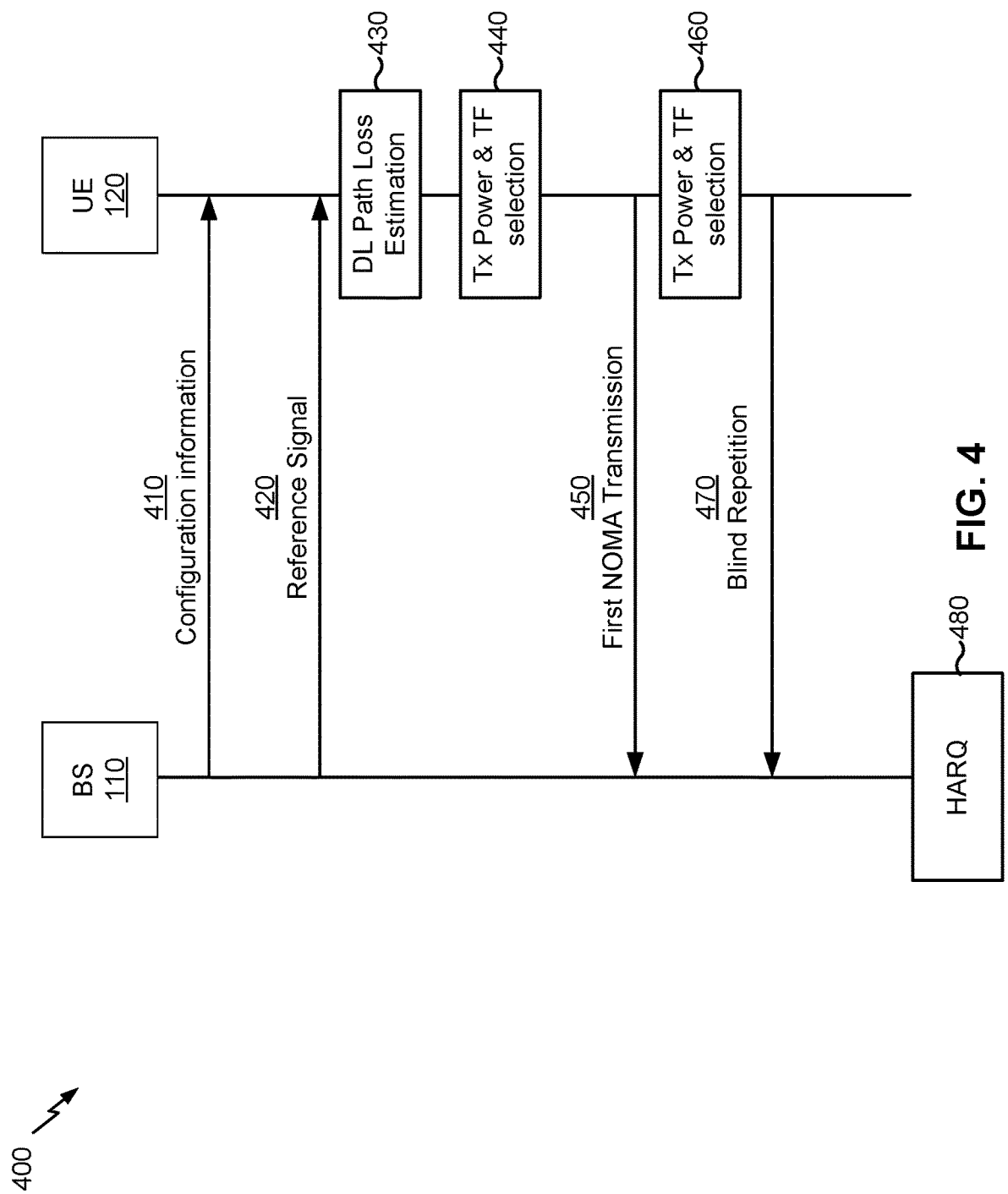
FIG. 4 is a diagram illustrating an example of power control for grant-free NOMA, in accordance with various aspects of the present disclosure.

FIG. 4 is a diagram illustrating an example 400 of power control for grant-free NOMA, in accordance with various aspects of the present disclosure.

As shown by reference number 410, a UE 120 may receive configuration information from a BS 110. The configuration information may include information associated with determining a transmit power of the UE 120. As one example, the configuration information may include at least part of the information described in connection with FIGS. 3 and 5. As shown by reference number 420, the UE 120 may receive a reference signal from the BS 110. The reference signal is described in more detail in connection with reference number 310 of FIG. 3, above. As shown by reference number 430, the UE 120 may perform downlink path loss estimation based at least in part on the reference signal. For example, the UE 120 may perform downlink path loss estimation based at least in part on the reference signal (e.g., based at least in part on a reference signal resource index of the reference signal indicated by the configuration information), as described in more detail in connection with reference 320 of FIG. 3.

In some aspects, the UE 120 may receive information identifying an uplink path loss value. For example, the BS 110 may provide the information identifying the uplink path loss value to the UE 120. In some aspects, the BS 110 may determine the uplink path loss value based at least in part on a previous transmission by the UE 120. In some aspects, the BS 110 may determine the uplink path loss value based at least in part on a transmission by another UE 120. For example, the BS 110 may determine the uplink path loss value based at least in part on a transmission by a UE 120 of a same UE group as the UE 120. In some aspects, the UE 120 may receive or determine information identifying a combined path loss value, as described in more detail elsewhere herein.

As shown by reference number 440, the UE 120 may determine a transmit power and/or a transport format based at least in part on the downlink path loss value. For example, the UE 120 may determine the transmit power and/or the transport format based at least in part on an uplink path loss value and/or a combined path loss value. In some aspects, the UE 120 may determine a configuration for a transmission, such as a data or control transmission, based at least in part on the configuration information. For example, the UE 120 may determine a UE group of the UE 120, and may determine the configuration in accordance with the configuration information. The configuration may identify information to be used to determine the transmit power, as described in more detail below in connection with FIG. 5. In some aspects, the configuration may identify the transmit power and/or the transport format.

As shown by reference number 450, the UE 120 may transmit a first transmission (e.g., a data or control transmission) to the BS 110. For example, the UE 120 may transmit the first transmission using the transmit power and/or the transport format, as described in more detail above in connection with FIG. 3.

As shown by reference number 460, the UE 120 may determine a transmit power and/or a transport format for a second transmission. Here, the second transmission is a blind repetition of the first transmission, shown by reference number 470. In some aspects, the second transmission may be different than the first transmission (e.g., may not be a repetition of the first transmission). The UE 120 may determine the transmit power and/or the transport format in a fashion similar to that described above in connection with reference number 440.

In some aspects, the second transmission may be associated with a different power level and/or transport format than the first transmission. In some aspects, the UE 120 may use different configuration information to determine the first transmission and the second transmission. In some aspects, a resource configuration of the first transmission may be different than a resource configuration of the second transmission.

In some aspects, the UE 120 may use a grant-free transmission scheme (described in connection with FIG. 4) for a first transmission and/or a second transmission, and may use a grant-based transmission scheme (described in connection with FIG. 3) for a retransmission. For example, if a first transmission fails as a grant-free transmission, the UE 120 may use the grant-based approach for a retransmission of the first transmission, which improves reliability of the retransmission. Additionally, or alternatively, the UE 120 may use a different multiple access scheme for a first transmission and a second transmission. For example, the UE 120 may use NOMA (e.g., grant-free NOMA) for a first transmission, and may use OMA (e.g., grant-free OMA or grant-based OMA) for a second transmission. In this way, the UE 120 may improve reliability of the retransmission. This may be particularly useful for a 2-step RACH preamble/payload transmission. For example, the UE 120 may use a grant-free transmission scheme for a first transmission (e.g., a contention-based transmission) of the preamble/payload, and may fall back to a grant-based transmission scheme for a retransmission of the preamble/payload if the first transmission is unsuccessful.

As shown by reference number 470, the UE 120 may transmit the second transmission (e.g., the repetition of the first transmission). For example, the UE 120 may transmit the second transmission using the transmit power and/or the transport format for the second transmission. In this way, the UE 120 may determine transmit power for a first transmission and/or a second transmission in a grant-free transmission scheme based at least in part on open loop power control. As shown by reference number 480, the BS 110 may perform a HARQ procedure based at least in part on the first transmission and the second transmission, as described in more detail elsewhere herein.

As indicated above, FIG. 4 is provided as an example. Other examples may differ from what is described with respect to FIG. 4.

Figure 5:
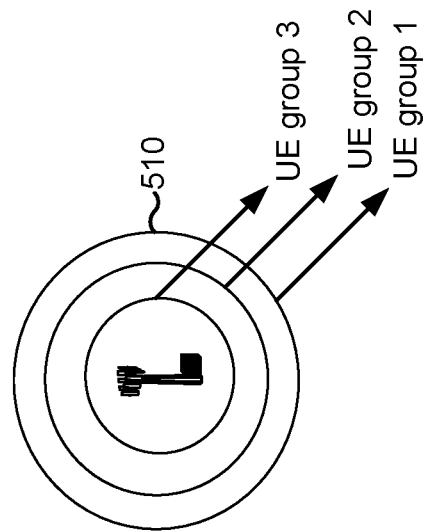
FIG. 5 is a diagram illustrating an example of configuration information for power control for grant-free NOMA, in accordance with various aspects of the present disclosure.

FIG. 5 is a diagram illustrating an example 500 of configuration information for power control for NOMA, in accordance with various aspects of the present disclosure. The configuration information shown in FIG. 5 is an example of configuration information that can be used to determine a transmit power for a UE in a grant-based transmission scheme or a grant-free transmission scheme.

As shown by reference number 510, a cell may be associated with a set of UE groups. Here, UEs of the UE groups 1, 2, and 3 may be located different distances from BS 110. However, a UE group may not necessarily be based on a location of the UE 120. For example, a UE 120 may determine a UE group based at least in part on a PHR, a BSR, a bandwidth of the UE 120, and/or the like.

As shown, the configuration information may be associated with a table 520. As further shown, the table 520 includes rows corresponding to UE groups 1, 2, and 3. Each UE 120 associated with a particular UE group j may use a same target received power ($P_0(j)$), physical resource block (PRB) size (M(j)), path loss compensation factor ($\alpha(j)$), TBS range ([Aj, Bj]), scrambling code seed (sj), spreading factor (SFj), number of branches (Nj), modulation per branch (Qj), and/or code rate (Rj). The PRB size M(j) may correspond to a bandwidth of the UE group. Furthermore, each UE group may be associated with a range of power headroom values [Uj, Vj]. In some aspects, UE 120 may select the UE group based at least in part on a power headroom of the UE 120. In some aspects, a subset of this information may be provided in the configuration information. In some aspects, information other than the above information may be provided in the configuration information. For example, the configuration information may identify respective transport formats of the UE groups, a power domain multiplexing scheme, and/or the like.

In some aspects, a UE 120 may determine a transmit power based at least in part on the configuration information. For example, the UE 120 may first determine a path loss value (e.g., a downlink path loss value) of PL(i) (e.g., using a reference signal associated with a reference signal index identified by a resource configuration of the configuration information). When the BSR and/or PHR of the UE 120 fall within a range of a UE group j of the table 520, and when the UE is configured to perform grant-free open-loop power control, the UE 120 may determine the transmit power as $P_{TX,open-loop}(i)=10 \log(M(j))+P_0(j)+\alpha(j)(PL(i))+\Delta_{TF}(j)$, wherein $\Delta_{TF}(j)$ is a function of modulation and coding scheme, spreading factor, and number of branches. In some aspects, the transmit power equation for open-loop power control may be used to determine a transmit power for a PUSCH of a 2-step RACH procedure.

When the BSR and/or PHR of the UE 120 fall within a range of a UE group j of the table 520, and when the UE is configured to perform closed-loop power control, the UE 120 may determine the transmit power as $P_{TX,closed-loop}(i)=10 \log(M(j))+P_0(j)+\alpha(j)(PL(i))+\Delta_{TF}(j)+f(j)$, wherein f(j) is a group-common TPC value used by the UE group j. In this way, the UE 120 may determine a configuration (e.g., one or more of the values specified in the table 520) based at least in part on a UE group of the UE 120, and may determine a transmit power based at least in part on the configuration. The above rules may be referred to as power reduction priority rules.

As indicated above, FIG. 5 is provided as an example. Other examples may differ from what is described with respect to FIG. 5.

Figure 6:
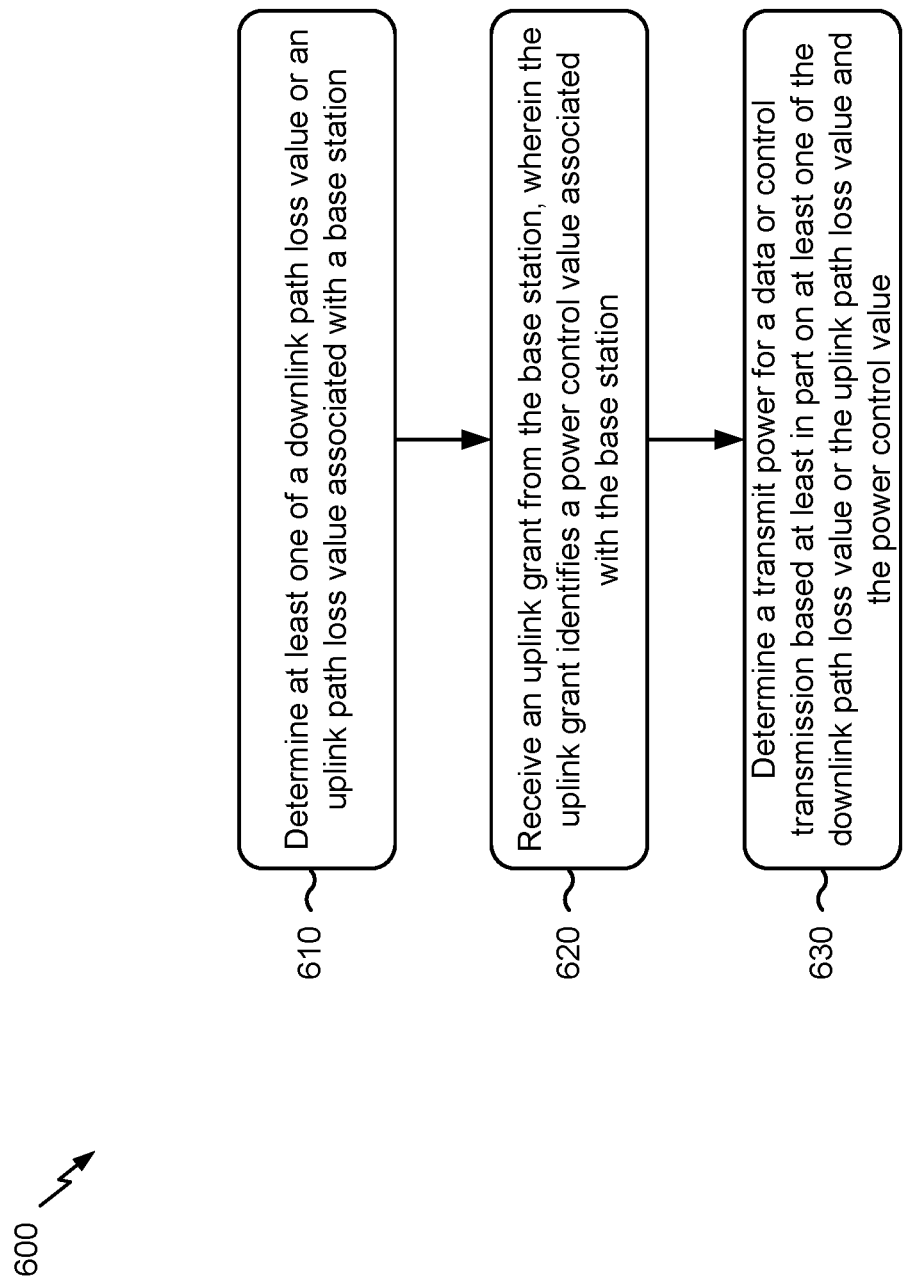
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs closed-loop power control.

As shown in FIG. 6, in some aspects, process 600 may include determining at least one of a downlink path loss value or an uplink path loss value associated with a base station (block 610). For example, the UE (e.g., using controller/processor 280 and/or the like) may determine at least one of a downlink path loss value or an uplink path loss value. In some aspects, the UE may receive information identifying the uplink path loss value. In some aspects, the UE may receive or determine information identifying a combined path loss value (e.g., a combination of the downlink path loss value and the uplink path loss value).

As shown in FIG. 6, in some aspects, process 600 may include receiving an uplink grant from the base station, wherein the uplink grant identifies a power control value associated with the base station (block 620). For example, the UE (e.g., using antenna 252, DEMOD 254, MIMO detector 256, receive processor 258, controller/processor 280, and/or the like) may receive an uplink grant from the base station. The uplink grant may identify or be associated with a power control value (e.g., a TPC value) associated with the base station. For example, the power control value may be determined by the base station.

As shown in FIG. 6, in some aspects, process 600 may include determining a transmit power for a data or control transmission based at least in part on at least one of the downlink path loss value or the uplink path loss value and the power control value (block 630). For example, the UE (e.g., using controller/processor 280 and/or the like) may determine a transmit power for a data or control transmission (e.g., a NOMA transmission, an OMA transmission, an initial transmission, a retransmission, a repetition of a transmission, etc.). In some aspects, the transmit power may be based at least in part on the downlink path loss value, the uplink path loss value, and/or the power control value.

Process 600 may include additional aspects, such as any single aspect or any combination of aspects described below and/or in connection with one or more other processes described elsewhere herein.

In a first aspect, the downlink path loss value is based at least in part on a reference signal that is quasi-collocated with the data or control transmission. In a second aspect, alone or in combination with the first aspect, the downlink path loss value is based at least in part on a group common control channel or a downlink data channel for broadcasting and multicasting common system information. In a third aspect, alone or in combination with any one or more of the first through second aspects, the uplink grant is received based at least in part on a scheduling request provided to the base station, wherein the power control value is based at least in part on the uplink path loss value, and wherein the uplink path loss value is determined using a physical channel or a reference signal associated with the scheduling request. In a fourth aspect, alone or in combination with any one or more of the first through third aspects, the data or control transmission is to be transmitted using non-orthogonal multiple access. The UE may provide at least one of a buffer status report or a power headroom value with the scheduling request.

In a fifth aspect, alone or in combination with any one or more of the first through fourth aspects, the UE may receive the uplink path loss value in a medium access control control element; and determine a combined path loss value based at least in part on the downlink path loss value and the uplink path loss value, wherein the transmit power is based at least in part on the combined path loss value.

In a sixth aspect, alone or in combination with any one or more of the first through fifth aspects, the uplink grant carrying the power control value is transmitted using UE-specific control signaling. In a seventh aspect, alone or in combination with any one or more of the first through sixth aspects, at least a part of the uplink grant carrying the power control value is received using a group common control channel. In an eighth aspect, alone or in combination with any one or more of the first through seventh aspects, the power control value is indicated using two or more bits of control information in a downlink control information payload. In a ninth aspect, alone or in combination with any one or more of the first through eighth aspects, the transmit power for the data or control transmission is determined based at least in part on at least one of the downlink path loss value or the uplink path loss value and a power headroom for a group of the UE.

In a tenth aspect, alone or in combination with any one or more of the first through ninth aspects, the UE may determine the group of the UE; or receive information identifying a radio network temporary identifier of the group of the UE. In an eleventh aspect, alone or in combination with any one or more of the first through tenth aspects, the UE may transmit the data or control transmission using the transmit power. In a twelfth aspect, alone or in combination with any one or more of the first through eleventh aspects, the transmit power is based at least in part on a weighted combination of at least two of the downlink path loss value, the uplink path loss value, and the power control value, and weights for the weighted combination are different for different UE groups within a cell. In a thirteenth aspect, alone or in combination with any one or more of the first through twelfth aspects, the data or control transmission comprises a contention-based random access channel transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
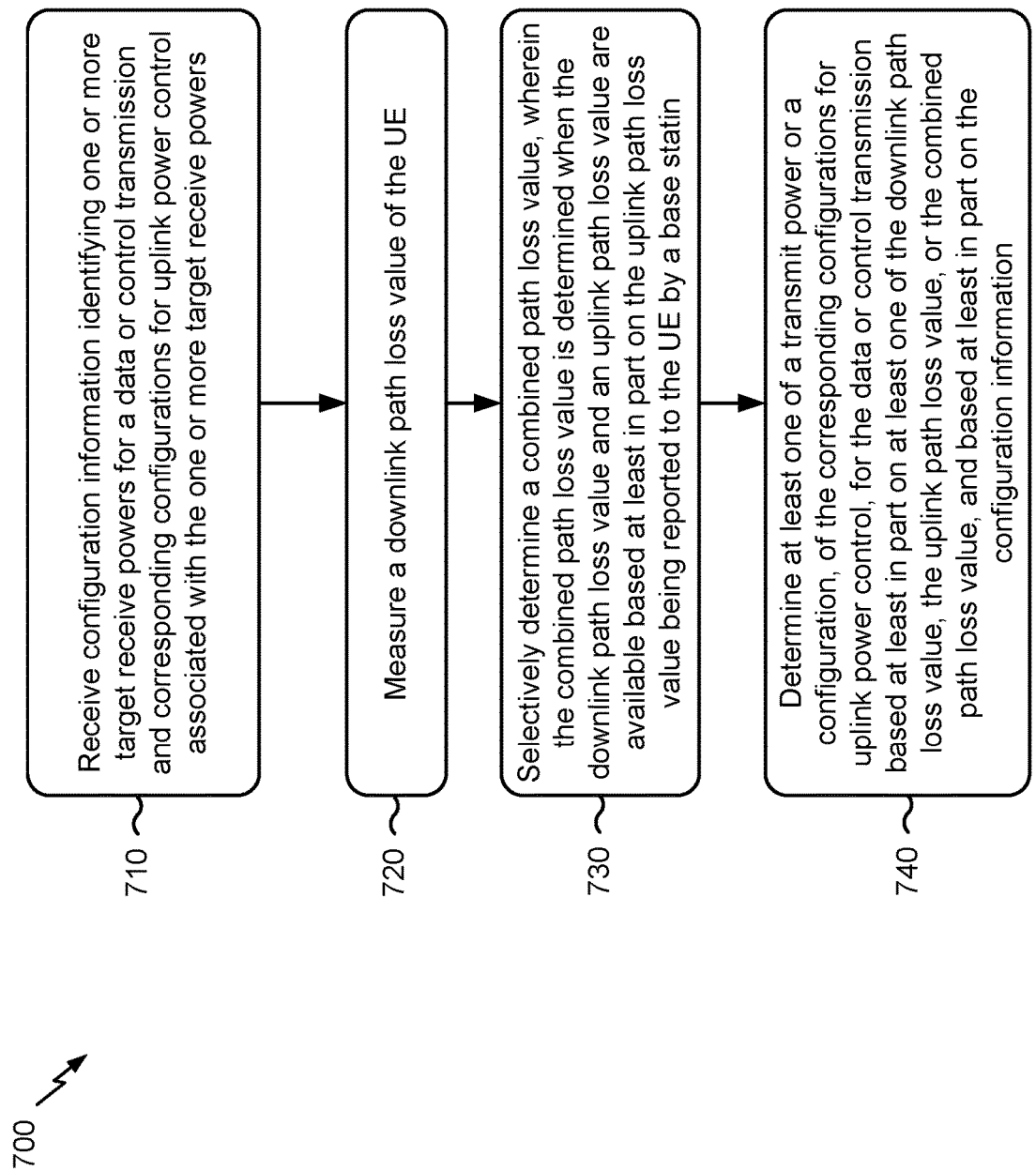
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs power control based at least in part on configuration information.

As shown in FIG. 7, in some aspects, process 700 may include receiving configuration information identifying one or more target receive powers for a data or control transmission and corresponding configurations for uplink power control associated with the one or more target receive powers (block 710). For example, the UE (e.g., using antenna 252, DEMOD 254, MIMO detector 256, receive processor 258, controller/processor 280, and/or the like) may receive configuration information. The configuration information may identify a target receive power for a data or control transmission. For example, the configuration information may identify the target receive power for data or control transmissions of a UE group. The configuration information may identify a corresponding configuration for uplink power control, and the corresponding configuration may be associated with the target receive power (and/or the UE group).

As shown in FIG. 7, in some aspects, process 700 may include measuring a downlink path loss value of the UE (block 720). For example, the UE (e.g., using antenna 252, DEMOD 254, MIMO detector 256, receive processor 258, controller/processor 280, and/or the like) may measure a downlink path loss value. In some aspects, the UE may measure the downlink path loss value based at least in part on a reference signal received from a base station.

As shown in FIG. 7, in some aspects, process 700 may include selectively determining a combined path loss value, wherein the combined path loss value is determined when the downlink path loss value and an uplink path loss value are available based at least in part on the uplink path loss value being reported to the UE by a base station (block 730). For example, in some aspects, the UE (e.g., using controller/processor 280 and/or the like) may selectively determine a combined path loss value. For example, the UE may determine the combined path loss value when the downlink path loss value and an uplink path loss value are available, and may not determine the combined path loss value otherwise. The uplink path loss value may be available based at least in part on the uplink path loss value being reported to the UE by a base station. For example, the base station may determine the uplink path loss value based at least in part on a reference signal (e.g., an SRS and/or the like) transmitted by the UE. The base station may report the uplink path loss value to the UE. The reference signal transmission by the UE and the reporting of the uplink path loss value may occur before the transmission of the data or control transmission. In some aspects, the uplink path loss value may be included in a downlink signal that triggers transmission of the data or control transmission.

As shown in FIG. 7, in some aspects, process 700 may include determining at least one of a transmit power or a configuration, of the corresponding configurations for uplink power control, for the data or control transmission based at least in part on at least one of the downlink path loss value, the uplink path loss value, or the combined path loss value, and based at least in part on the configuration information (block 740). For example, the UE (e.g., using controller/processor 280 and/or the like) may determine a transmit power and/or a configuration. The configuration may be one of the corresponding configurations for uplink power control. The transmit power and/or the configuration may be for the data or control transmission. The transmit power may be based at least in part on the configuration information, and may be based at least in part on the downlink path loss value, the uplink path loss value, and/or the combined path loss value. For example, the transmit power may be determined using the downlink path loss value or the uplink path loss value when only one of these values has been determined and/or when the combined path loss value has not been determined, or may be determined using the combined path loss value when the combined path loss value has been determined.

Process 700 may include additional aspects, such as any single aspect or any combination of aspects described below and/or in connection with one or more other processes described elsewhere herein.

In a first aspect, the UE may receive information identifying the uplink path loss value or transmit a reference signal, on an uplink, to enable the base station to determine the uplink path loss value before the data or control transmission. In a second aspect, alone or in combination with the first aspect, the UE may select a group of UEs within a cell, of one or more groups of UEs within the cell, wherein one or more target receive powers and corresponding configurations for uplink power control are assigned to the one or more groups of UEs, and wherein determining the transmit power is further based at least in part on a target receive power corresponding to the group of UEs. In a third aspect, alone or in combination with any one or more of the first through second aspects, the UE may determine a transport format for the data transmission according to the configuration, wherein the transport format for the data or control transmission includes at least one of a medium access control (MAC) control element (CE) generated by an upper layer, uplink control information (UCI) multiplexed with an uplink data channel of the data or control transmission, or a physical uplink control channel (PUCCH). In a fourth aspect, alone or in combination with any one or more of the first through third aspects, the downlink path loss value is based at least in part on a group common control channel of the UE or a downlink data channel for broadcasting and multicasting common system information.

In a fifth aspect, alone or in combination with any one or more of the first through fourth aspects, the data or control transmission is an initial data or control transmission. The UE may determine at least one of a transmit power or a configuration for a retransmission of the initial data transmission based at least in part on at least one of the downlink path loss value or the uplink path loss value and the configuration information. In a sixth aspect, alone or in combination with any one or more of the first through fifth aspects, the transmit power or a transport format for the retransmission of the initial data transmission is different than the transmit power or a transport format for the initial data transmission.

In a seventh aspect, alone or in combination with any one or more of the first through sixth aspects, the configuration is associated with non-orthogonal multiple access (NOMA) and the configuration identifies at least one of: a NOMA-specific resource configuration in at least one of a time domain, a frequency domain, a code domain, or a space domain, or a power domain multiplexing scheme.

In an eighth aspect, alone or in combination with any one or more of the first through seventh aspects, the configuration information is received from a base station using radio resource control signaling or group common signaling, and the configuration information is associated with multiple UEs including the UE. In a ninth aspect, alone or in combination with any one or more of the first through eighth aspects, the UE may determine a selected target receive power of the one or more target receive powers associated with the corresponding configurations based at least in part on at least one of a power headroom or a buffer status of the UE, wherein determining at least one of the transmit power or the configuration is based at least in part on the selected target receive power. In a tenth aspect, alone or in combination with any one or more of the first through ninth aspects, the selected target receive power is determined based at least in part on at least one of a power headroom or a buffer status of the UE. In an eleventh aspect, alone or in combination with any one or more of the first through tenth aspects, the data or control transmission comprises a contention-based random access channel transmission.

In a twelfth aspect, alone or in combination with any one or more of the first through eleventh aspects, the UE may determine a transmit power for a retransmission of the initial data or control transmission. In a thirteenth aspect, alone or in combination with any one or more of the first through twelfth aspects, determining the transmit power for the retransmission uses a same reference signal resource configuration for measuring the downlink path loss value and determining the transmit power for the initial data or control transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
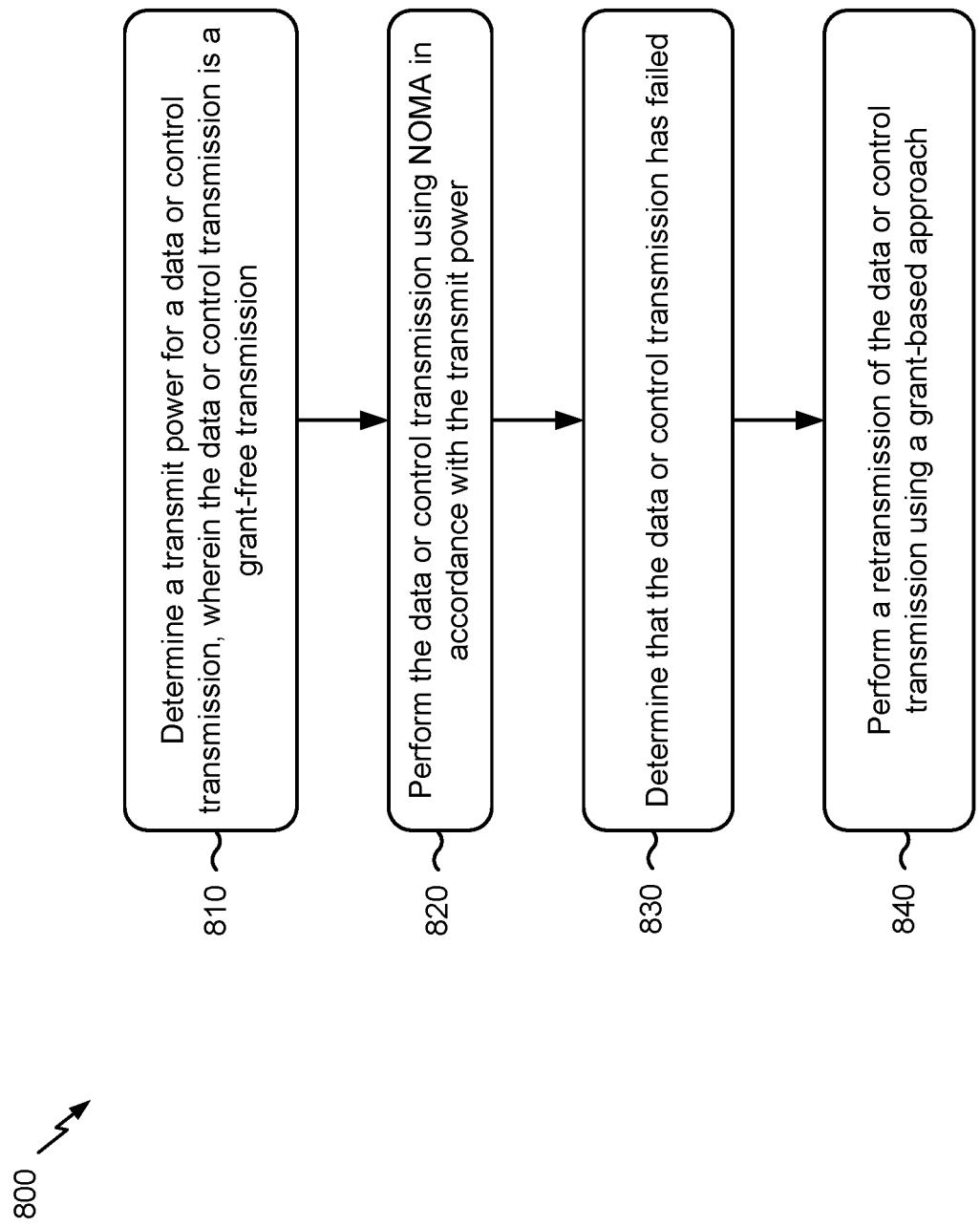
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with power control design for non-orthogonal multiple access.

As shown in FIG. 8, in some aspects, process 800 may include determining a transmit power for a data or control transmission, wherein the data or control transmission is a grant-free transmission (block 810). For example, the UE (e.g., using antenna 252, DEMOD 254, MIMO detector 256, receive processor 258, controller/processor 280, and/or the like) may determine a transmit power for a data or control transmission, as described above. For example, the UE may use the techniques described in connection with FIGS. 3-5 to determine the transmit power for the data or control transmission. In some aspects, the data or control transmission is a grant-free transmission. In some aspects, the data or control transmission may include one or more transmissions associated with a 2-step RACH procedure, such as a MsgA of the 2-step RACH procedure. In such a case, the contention-based PUSCH transmission of the MsgA may use grant-free NOMA. For example, different UEs may share the same time and/or frequency resources in a non-orthogonal fashion.

As further shown in FIG. 8, in some aspects, process 800 may include performing the data or control transmission using NOMA in accordance with the transmit power (block 820). For example, the UE (e.g., using controller/processor 280, transmit processor 264, TX MIMO processor 266, MOD 254, antenna 252, and/or the like) may perform the data or control transmission using NOMA in accordance with the transmit power, as described above.

As further shown in FIG. 8, in some aspects, process 800 may include determining that the data or control transmission has failed (block 830). For example, the UE (e.g., using antenna 252, DEMOD 254, MIMO detector 256, receive processor 258, controller/processor 280, and/or the like) may determine that the data or control transmission has failed, as described above. In some aspects, the UE may determine that multiple repetitions of the data or control transmission have failed, such as a set number of repetitions, all repetitions, and/or the like.

As further shown in FIG. 8, in some aspects, process 800 may include performing a retransmission of the data or control transmission using a grant-based approach (block 840). For example, the user equipment (e.g., using receive processor 258, transmit processor 264, controller/processor 280, memory 282, and/or the like) may perform a retransmission of the data or control transmission using a grant-based approach, as described above. The retransmission may be a retransmission of at least part of the data or control transmission, such as a PUSCH of the data or control transmission. In some aspects, the UE may transmit the PUSCH on a granted resource.

Process 800 may include additional aspects, such as any single aspect or any combination of aspects described below and/or in connection with one or more other processes described elsewhere herein.

In a first aspect, the retransmission uses orthogonal multiple access in at least one of a time domain, a frequency domain, a code domain, or a spatial domain.

In a second aspect, alone or in combination with the first aspect, the retransmission uses NOMA. For example, the retransmission may use a shared time and/or frequency resource.

In a third aspect, alone or in combination with one or more of the first and second aspects, determining the transmit power is based at least in part on a NOMA-specific resource configuration for reference signals, data, and control information.

In a fourth aspect, alone or in combination with one or more of the first through third aspects, the NOMA-specific resource configuration includes an indication of a reference signal resource index for determining the transmit power.

In a fifth aspect, alone or in combination with one or more of the first through fourth aspects, the data or control transmission comprises a random access preamble and an uplink data or control channel associated with respective transmit powers, wherein determining the transmit power for the random access preamble and for the shared channel is based at least in part on the NOMA-specific resource configuration.

In a sixth aspect, alone or in combination with one or more of the first through fifth aspects, determining the transmit power for the data or control transmission is based at least in part on a downlink path loss value of the UE. For example, the UE may use a reference signal associated with a reference signal resource index identified by configuration information (e.g., a resource configuration) of the UE. In some aspects, the UE may use the same reference signal resource index to determine the retransmission's transmit power and the data or control transmission's transmit power.

In a seventh aspect, alone or in combination with one or more of the first through sixth aspects, determining the transmit power for the data or control transmission is based at least in part on a grant-free open-loop power control technique.

In an eighth aspect, alone or in combination with one or more of the first through seventh aspects, the grant-free open-loop power control technique is based at least in part on a UE group of the UE.

In a ninth aspect, alone or in combination with one or more of the first through eighth aspects, the UE group of the UE is assigned based at least in part on a bandwidth (e.g., a PRB size) of the UE.

In a tenth aspect, alone or in combination with one or more of the first through ninth aspects, the UE is associated with the UE group based at least in part on a modulation order or a code rate of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
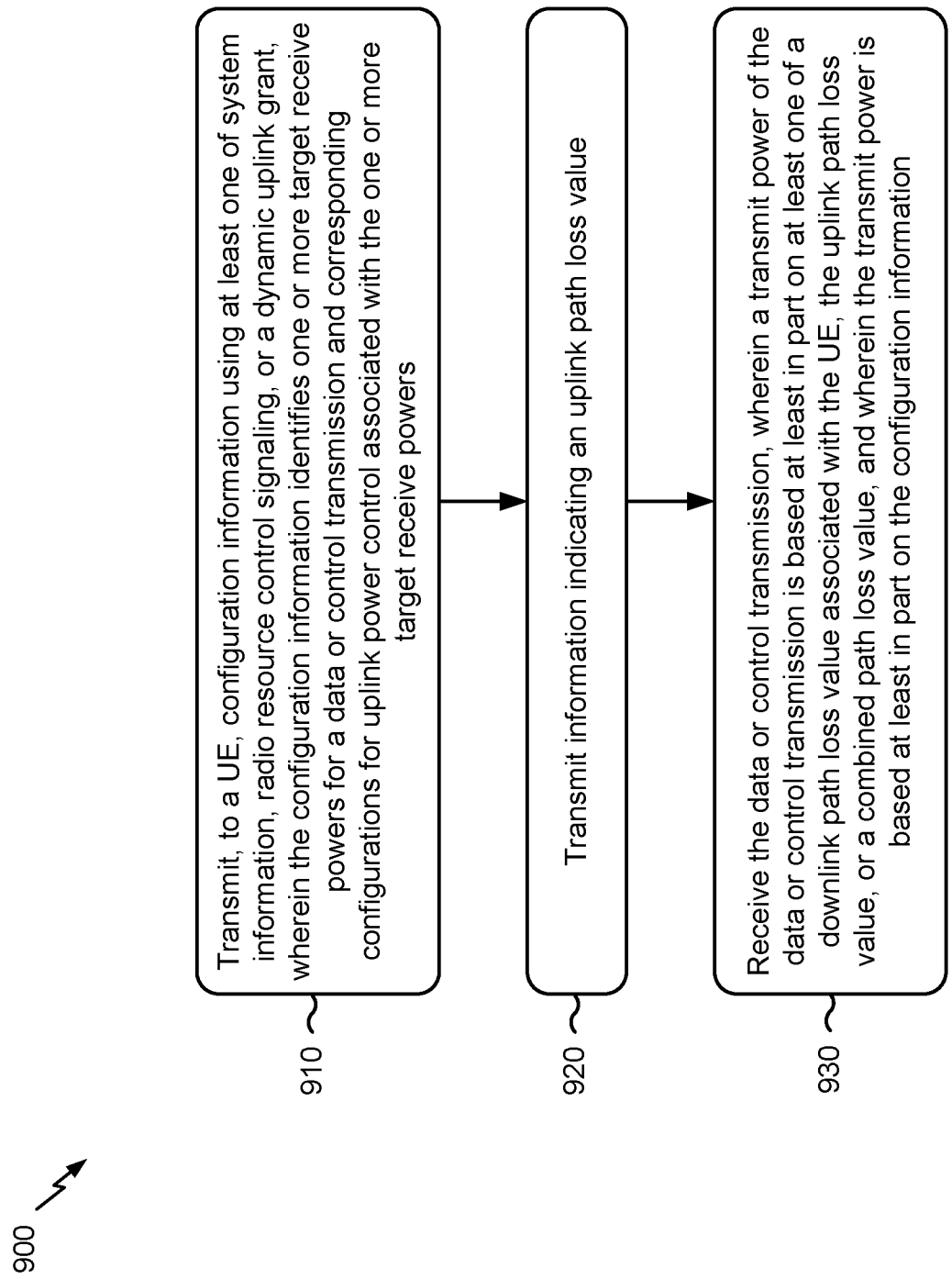
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where a base station (e.g., base station 110 and/or the like) performs operations associated with power control design for non-orthogonal multiple access.

As shown in FIG. 9, in some aspects, process 900 may include transmitting, to a UE, configuration information using at least one of system information, radio resource control signaling, or a dynamic uplink grant, wherein the configuration information identifies one or more target receive powers for a data or control transmission and corresponding configurations for uplink power control associated with the one or more target receive powers (block 910). For example, the base station (e.g., using controller/processor 240, transmit processor 220, TX MIMO processor 230, MOD 232, antenna 234, and/or the like) may transmit, to a UE, configuration information using at least one of system information, radio resource control signaling, or a dynamic uplink grant, as described above. In some aspects, the configuration information identifies one or more target receive powers for a data or control transmission and corresponding configurations for uplink power control associated with the one or more target receive powers.

As further shown in FIG. 9, in some aspects, process 900 may include transmitting information indicating an uplink path loss value (block 920). For example, the base station (e.g., using transmit processor 220, receive processor 238, controller/processor 240, memory 242, and/or the like) may transmit information indicating an uplink path loss value, as described above. In some aspects, the base station may determine the uplink path loss value. For example, the base station may determine the uplink path loss value based at least in part on a reference signal transmitted by a UE. The UE may transmit the reference signal, and the base station may determine the uplink path loss value, before a data or control transmission is transmitted by the UE.

As further shown in FIG. 9, in some aspects, process 900 may include receiving the data or control transmission, wherein a transmit power of the data or control transmission is based at least in part on at least one of a downlink path loss value associated with the UE, the uplink path loss value, or a combined path loss value, and wherein the transmit power is based at least in part on the configuration information (block 930). For example, the base station (e.g., using transmit processor 220, receive processor 238, controller/processor 240, memory 242, and/or the like) may receive the data or control transmission, as described above. In some aspects, a transmit power of the data or control transmission is based at least in part on at least one of a downlink path loss value associated with the UE, the uplink path loss value, or a combined path loss value. For example, the transmit power may be based at least in part on the combined path loss value when the UE has determined the combined path loss value (e.g., using the uplink path loss value and the downlink path loss value). The transmit power may be based at least in part on the uplink path loss value or the downlink path loss value when the UE has determined or received information identifying one of the uplink path loss value or the downlink path loss value. In some aspects, the transmit power is based at least in part on the configuration information.

In some aspects, the base station may provide a grant for a data or control transmission based at least in part on the data or control transmission failing. For example, a first transmission of the data or control transmission may be a grant-free transmission, as described elsewhere herein. In such a case, the base station may determine that the grant-free transmission has failed, and may provide a grant for a retransmission of the data or control transmission using a grant-based approach. In some aspects, the retransmission uses orthogonal multiple access in at least one of a time domain, a frequency domain, a code domain, or a spatial domain.

In some aspects, the retransmission uses NOMA in at least one of a time domain, a frequency domain, a code domain, or a spatial domain. In some aspects, the data or control transmission comprises a random access preamble and a data or control channel associated with respective transmit powers. In some aspects, the transmit power for the data or control transmission is based at least in part on a grant-free open-loop power control technique that is based at least in part on a UE group of the UE. In some aspects, the base station may assign the UE group of the UE based at least in part on a bandwidth of the UE. In some aspects, the base station may perform UE grouping based at least in part on a modulation order or a code rate of UEs covered by the base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be openended terms. Further, the phrase "based on" is intended to mean "based, at least in part, on" unless explicitly stated otherwise.

What is claimed is:

1. A user equipment (UE) for wireless communication, comprising:
one or more memories; and
one or more processors, coupled to the one or more memories, configured to:
determine a transmit power for a MsgA transmission, wherein the MsgA transmission is a grant-free transmission and is associated with a random access procedure;
perform the MsgA transmission using non-orthogonal multiple access (NOMA) in accordance with the transmit power;
determine that the MsgA transmission has failed; and
perform a fallback to a grant-based transmission based at least in part on the MsgA transmission having failed.

2. The UE of claim 1, wherein the grant-based transmission uses orthogonal multiple access in at least one of:
a time domain,
a frequency domain,
a code domain, or
a spatial domain.

3. The UE of claim 1, wherein the grant-based transmission uses NOMA in at least one of:
a time domain,
a frequency domain,
a code domain, or
a spatial domain.

4. The UE of claim 1, wherein the one or more processors, to determine the transmit power, are configured to:
determine the transmit power based at least in part on a NOMA-specific resource configuration for reference signals, data, and control information.

5. The UE of claim 4, wherein the NOMA-specific resource configuration includes an indication of a reference signal resource index for determining the transmit power.

6. The UE of claim 1, wherein the MsgA transmission comprises a random access preamble and a data or control channel, and
wherein the one or more processors, to determine the transmit power, are configured to:
determine the transmit power for the random access preamble.

7. The UE of claim 1, wherein the one or more processors, to determine the transmit power for the MsgA transmission, are configured to:
determine the transmit power for the MsgA transmission based at least in part on a downlink path loss value of the UE.

8. The UE of claim 1, wherein the one or more processors, to determine the transmit power for the MsgA transmission, are configured to:
determine the transmit power for the MsgA transmission based at least in part on a grant-free open-loop power control technique that is based at least in part on a UE group of the UE.

9. The UE of claim 8, wherein the UE group of the UE is assigned based at least in part on a bandwidth of the UE; or
wherein the UE is associated with the UE group based at least in part on a modulation order or a code rate of the UE.

10. The UE of claim 8, wherein the one or more processors, to perform the fallback to the grant-based transmission at least in part on the MsgA transmission having failed, are configured to:
perform the fallback to the grant-based transmission based at least in part on a set quantity of repetitions of the MsgA transmission having failed.

11. A method of wireless communication performed by a user equipment (UE), comprising:
determining a transmit power for a MsgA transmission, wherein the MsgA transmission is a grant-free transmission and is associated with a random access procedure;
performing the MsgA transmission using non-orthogonal multiple access (NOMA) in accordance with the transmit power;
determining that the MsgA transmission has failed; and
performing a fallback to a grant-based transmission based at least in part on the MsgA transmission having failed.

12. The method of claim 11, wherein the grant-based transmission uses orthogonal multiple access in at least one of:
a time domain,
a frequency domain,
a code domain, or
a spatial domain.

13. The method of claim 11, wherein the grant-based transmission uses NOMA in at least one of:
a time domain,
a frequency domain,
a code domain, or
a spatial domain.

14. The method of claim 11, wherein determining the transmit power is based at least in part on a NOMA-specific resource configuration for reference signals, data, and control information.

15. The method of claim 14, wherein the NOMA-specific resource configuration includes an indication of a reference signal resource index for determining the transmit power.

16. The method of claim 15, wherein the MsgA transmission comprises a random access preamble and a data or control channel associated with respective transmit powers, and wherein determining the transmit power for the random access preamble and for the data or control channel is based at least in part on the NOMA-specific resource configuration.

17. The method of claim 11, wherein determining the transmit power for the MsgA transmission is based at least in part on a downlink path loss value of the UE.

18. The method of claim 11, wherein determining the transmit power for the MsgA transmission is based at least in part on a grant-free open-loop power control technique that is based at least in part on a UE group of the UE.

19. The method of claim 18, wherein the UE group of the UE is assigned based at least in part on a bandwidth of the UE.

20. The method of claim 18, wherein the UE is associated with the UE group based at least in part on a modulation order or a code rate of the UE.

21. A non-transitory computer-readable medium storing a set of instructions for wireless communication, the set of instructions comprising:
one or more instructions that, when executed by one or more processors of a user equipment (UE), cause the UE to:
determine a transmit power for a MsgA transmission, wherein the MsgA transmission is a grant-free transmission and is associated with a random access procedure;
perform the MsgA transmission using non-orthogonal multiple access (NOMA) in accordance with the transmit power;
determine that the MsgA transmission has failed; and
perform a fallback to a grant-based transmission based at least in part on the MsgA transmission having failed.

22. The non-transitory computer-readable medium of claim 21, wherein the grant-based transmission uses orthogonal multiple access in at least one of:
a time domain,
a frequency domain,
a code domain, or
a spatial domain.

23. The non-transitory computer-readable medium of claim 21, wherein the grant-based transmission uses NOMA in at least one of:
a time domain,
a frequency domain,
a code domain, or
a spatial domain.

24. The non-transitory computer-readable medium of claim 21, wherein the one or more instructions, that cause the UE to determine the transmit power, cause the UE to:
determine the transmit power based at least in part on a NOMA-specific resource configuration for reference signals, data, and control information.

25. The non-transitory computer-readable medium of claim 24, wherein the NOMA-specific resource configuration includes an indication of a reference signal resource index for determining the transmit power.

26. The non-transitory computer-readable medium of claim 25, wherein the MsgA transmission comprises a random access preamble and a data or control channel associated with respective transmit powers, and
wherein the one or more instructions, that cause the UE to determine the transmit power for the random access preamble and for the data or control channel, cause the UE to:
determine the transmit power for the random access preamble and for the data or control channel based at least in part on the NOMA-specific resource configuration.

27. The non-transitory computer-readable medium of claim 21, wherein the one or more instructions, that cause the UE to determine the transmit power for the MsgA transmission, cause the UE to:
determine the transmit power for the MsgA transmission based at least in part on a downlink path loss value of the UE.

28. The non-transitory computer-readable medium of claim 21, wherein the one or more instructions, that cause the UE to determine the transmit power for the MsgA transmission, cause the UE to:
determine the transmit power for the MsgA transmission based at least in part on a grant-free open-loop power control technique that is based at least in part on a UE group of the UE.

29. The non-transitory computer-readable medium of claim 28, wherein the UE group of the UE is assigned based at least in part on a bandwidth of the UE.

30. An apparatus for wireless communication, comprising:
means for determining a transmit power for a MsgA transmission, wherein the MsgA transmission is a grant-free transmission and is associated with a random access procedure;
means for performing the MsgA transmission using non-orthogonal multiple access (NOMA) in accordance with the transmit power;
means for determining that the MsgA transmission has failed; and
means for performing a fallback to a grant-based transmission based at least in part on the MsgA transmission having failed.

* * * * *